(12) United States Patent
Azulay

(10) Patent No.: US 6,517,651 B2
(45) Date of Patent: Feb. 11, 2003

(54) APPARATUS AND METHOD FOR JOINING FABRICS WITHOUT SEWING

(75) Inventor: Meir Azulay, D.M. Misgav (IL)

(73) Assignee: Tefron Ltd., Bnei-Brak (IL)

( * ) Notice: Subject to any disclaimer, the term of this patent is extended or adjusted under 35 U.S.C. 154(b) by 137 days.

(21) Appl. No.: 09/747,847

(22) Filed: Dec. 21, 2000

(65) Prior Publication Data

US 2002/0079039 A1 Jun. 27, 2002

(51) Int. Cl.[7] ............................................. B29C 65/08
(52) U.S. Cl. .................. 156/73.1; 156/290; 156/308.4; 156/580.2
(58) Field of Search .................. 156/64, 73.1, 290, 156/308.2, 308.4, 580.1, 580.2

(56) References Cited

U.S. PATENT DOCUMENTS

| | | | | |
|---|---|---|---|---|
| 3,666,599 A | * | 5/1972 | Obeda | 156/380 |
| 3,734,805 A | * | 5/1973 | Obeda et al. | 156/580 |
| 3,808,080 A | * | 4/1974 | Parry | 156/580 |
| 3,852,144 A | * | 12/1974 | Parry | 156/510 |
| 4,090,897 A | | 5/1978 | Minick | |
| 4,313,778 A | | 2/1982 | Mims | |
| 4,333,791 A | * | 6/1982 | Onishi | 156/580.1 |
| 4,355,425 A | | 10/1982 | Jones et al. | |
| 4,534,819 A | * | 8/1985 | Payet et al. | 156/515 |
| 4,823,713 A | * | 4/1989 | Ogawa et al. | 112/217 |
| 5,464,488 A | | 11/1995 | Servin | |
| 5,520,774 A | * | 5/1996 | Palacios et al. | 156/580.1 |
| 5,669,996 A | | 9/1997 | Jessup | |
| 5,820,443 A | | 10/1998 | Burr | |

FOREIGN PATENT DOCUMENTS

| | | |
|---|---|---|
| EP | 0 032 703 A1 | 7/1981 |
| EP | 0 164 236 A1 | 12/1985 |
| EP | 0 199 472 A2 | 10/1986 |
| FR | 1 587 428 | 3/1970 |
| JP | 03126529 | 5/1991 |

* cited by examiner

Primary Examiner—James Sells
(74) Attorney, Agent, or Firm—Alston & Bird LLP

(57) ABSTRACT

An apparatus and method for joining together two or more fabric components without thread, the components including at least one ultrasonically bondable component. The apparatus comprises an ultrasonic horn operable to emit ultrasonic energy through a fabric-engaging end face thereof, and a rotatable anvil support having an outer peripheral surface on which one or a plurality of anvil supports are formed. The anvil support and the horn are arranged so as to define a nip between the respective fabric-engaging surfaces thereof for receiving the components to be joined. The anvil support rotates about an axis thereof as the components pass through the nip such that the outer peripheral surface of the anvil support defining the anvil structures is stationary relative to the components passing through the nip. The horn emits ultrasonic energy and the anvil structures focus the ultrasonic energy on one or more regions of the at least one ultrasonically bondable component contacted by the anvil structure(s) so as to locally heat and bond the one or more regions.

16 Claims, 5 Drawing Sheets

APPARATUS AND METHOD FOR JOINING FABRICS WITHOUT SEWING

FIELD OF THE INVENTION

The present invention relates to apparatus and methods for joining fabrics and, more particularly, to apparatus and methods for joining fabrics without sewing.

BACKGROUND OF THE INVENTION

Garments have traditionally been produced by a cut-and-sew technique in which a plurality of separate fabric pieces are joined together, typically by sewing with thread, to form the finished garment. The drawbacks of this method of production are well known, and thus efforts have been made to devise alternative methods of production that can reduce or eliminate the amount of sewing required for assembling a garment. Major strides in this direction have been made, at least for certain types of garments, by applying circular knitting techniques to produce the main tubular body of the garment without seams. In general, however, it is still necessary to finish the garment by sewing, such as for applying decorative or elastic trim or banding around leg openings, neck openings, arm openings, waist openings, or the like, and for joining different portions of the garment that cannot be integrally knit together during the circular knitting process. For example, a so-called "seamless" panty still requires at least one seam, typically located in a crotch region of the panty, for joining together a front panel and a back panel of the tubular fabric blank from which the panty is made.

The formation of such seams and the attachment of elements such as elastic are to this day still performed by sewing with thread in the commercial production of most garments. This generally requires the manufacturer to keep an extensive inventory of dye-to-match sewing thread so that the thread will be the same color as the fabric of the garment. It would be desirable to eliminate the requirement of sewing with thread to assemble and finish a garment.

U.S. Pat. No. 5,820,443 issued to Burr discloses a brassiere having two side parts each defining a cup joined together in a front central area by a thermally produced weld, in particular a weld formed by ultrasonic welding. Each. Ride part includes a blank covering the entire surface of the side part and composed at least in part of thermoplastically fusible fibers. Frame-like reinforcement parts also composed of thermoplastically fusible fibers are ultrasonically welded to the blank parts at least along their outer edges. Back fasteners and shoulder straps are attached to the side parts by ultrasonic welding. The patent schematically illustrates an apparatus for forming the welded joint between the two side parts in the front central area. The apparatus consists of a bottom abutment on which the material to be joined is supported, and a sonotrode that is lowered into engagement with the material to compress and weld the material, similar to a pressing operation. It will be appreciated that such an apparatus would be of limited usefulness in the general assembly of garments of various types, because many garments require long seams between parts for which the pressing type of operation described in the Burr patent would be inefficient and cumbersome.

SUMMARY OF THE INVENTION

The present invention enables a wide variety of garments to be assembled without sewing. The apparatus and method of the invention can join components of a garment with seams that are as strong as or stronger than conventional stitched seams, and the seams can be made faster than conventional sewing. The apparatus is also safer and much quieter than a conventional sewing machine, thus providing a better work environment. Moreover, unlike a joint made by conventional sewing with thread, the joint made in accordance with the invention does not limit the degree of stretch of the fabric, which is beneficial in some applications. To these ends, an apparatus is provided for joining together two or more fabric components without thread, the components including at least one ultrasonically bondable component. The apparatus comprises an ultrasonic horn operable to emit ultrasonic energy through a fabric-engaging end face thereof, and a movable anvil support having an outer peripheral fabric-engaging surface that defines one or more anvil structures for focusing ultrasonic energy emitted by the horn. The anvil structure(s) and the horn are arranged so as to define a nip between the respective fabric-engaging surfaces thereof for receiving the components to be joined. The movable anvil support rotates about an axis thereof as the components pass through the nip such that the anvil structures are stationary relative to the components passing through the nip. The horn emits ultrasonic energy and the one or more anvil structures focus the ultrasonic energy on one or more regions of the at least one ultrasonically bondable component in the nip so as to locally heat and bond the one or more regions. Thus, the apparatus of the invention enables even very long continuous seams to be made in an efficient manner.

Preferably, the apparatus includes a drive system for engaging the components and moving the components through the nip. Advantageously, the anvil support is a wheel or disk-shaped member that is rotatably driven and comprises part of the drive system, rotation of the anvil support causing the components to be moved through the nip. One or more anvil structures are formed on the outer peripheral surface of the wheel. The drive system preferably includes a main drive motor coupled with the wheel for rotatably driving the wheel. Alternatively, the wheel could be freewheeling, and the fabric components could be moved through the nip in another fashion.

In one preferred embodiment of the invention, the apparatus is adapted for attaching a strip of ultrasonically bondable trim along an edge of a fabric component by folding the trim over the edge of the component and bonding the trim thereto. The trim can be, for example, an elastic banding or a decorative trim. To this end, the apparatus includes a feed assembly for folding the trim and feeding the folded trim into the nip between the horn and the anvil wheel. The feed assembly preferably includes a feed motor for rotatably driving a feed roll that engages the trim so as to advance the trim from a trim supply toward the nip. A controller coordinates operation of the main drive motor for the anvil wheel and the feed motor for the trim such that the trim is advanced at a rate substantially matching the speed of the outer peripheral surface of the anvil wheel.

The anvil structures on the periphery of the anvil wheel can be designed to impart various patterned appearances to the fabric components being joined. As one example, the anvil structures can be configured to impart an appearance of conventional stitching to the fabric. This can be accomplished by providing protrusions on the anvil wheel regularly spaced about its circumference to impart the appearance of holes formed by a needle in conventional sewing. Various styles of stitching can be simulated. Alternatively, the anvil structure can be continuous rather than discontinuous, so as to form a continuous bond line along the fabric as the fabric passes through the nip of the apparatus.

The invention thus offers several benefits. The seams produced by the apparatus can be made faster than is typically possible with conventional sewing machines, the seams can be as strong as or stronger than stitched seams, and the seams do not limit the stretch of the fabric as stitched seams typically do. There is no need to keep an inventory of dye-to-match sewing thread. The apparatus has few moving parts and thus is much quieter than a conventional sewing machine. Needles and their associated hazards are eliminated and, as an ancillary benefit of the improved safety of the apparatus, new operators can be more easily trained because there is no need to overcome their initial fear as is often the case with conventional sewing machines.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the description, terms of direction or orientation such as "upper", "lower", "vertical", "horizontal", "left", "right", etc., are used with reference to the drawings and are used solely for convenience of description without being limiting in any way.

Figure 1:
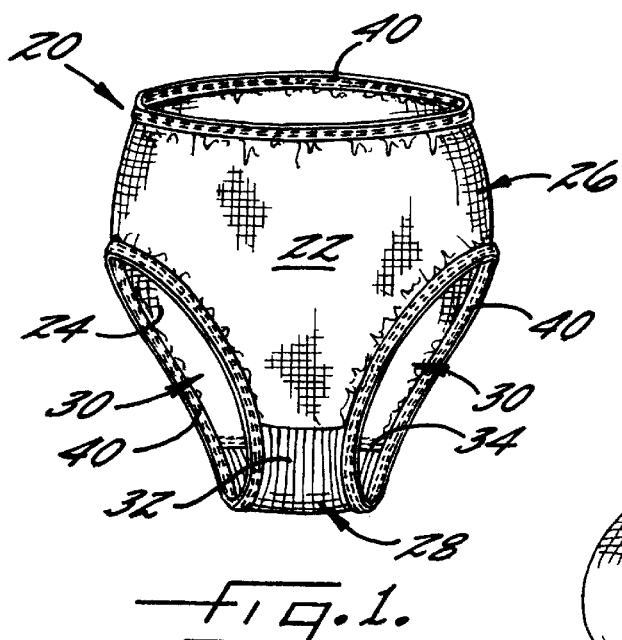
FIG. 1 is a perspective view of a panty in accordance with one preferred embodiment of the invention.
Figure 2:
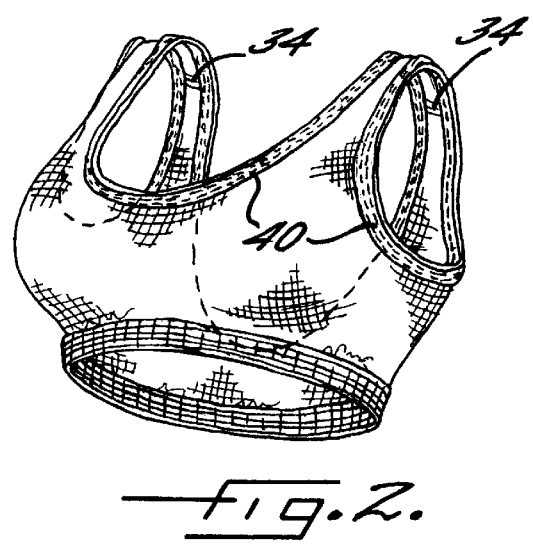
FIG. 2 is a perspective view of a brassiere in accordance with another preferred embodiment of the invention.
Figure 3:
FIG. 3 is a perspective view of a shirt or blouse in accordance with a further embodiment of the invention.

FIGS. 1, 2, and 3 show various types of garments, given by way of non-limiting example, to which the present invention can be applied. Although the illustrated examples relate to various items of women's apparel, it will be understood that the invention is in no way limited to women's apparel, but applies to a wide variety of both men's and women's garments and, even more broadly, to any sort of fabric article requiring joints between different fabric components of the article. The invention is based on the principle of eliminating the process of sewing with thread to assemble and finish garments of various types. One aspect of the invention relates to the attachment of decorative and/or elastic trim or banding along edges of a garment. FIG. 1 depicts a panty 20 comprising a front panel 22 and a back panel 24 having opposite sides joined to or integrally knit with opposite sides of the front panel such that the front and back panels collectively form a generally tubular fabric body 26. Lower portions of the front and back panels are joined together in a suitable fashion so as to form a crotch or gusset portion 28 of the panty that extends between the wearer's legs and so as to form a pair of leg openings 30. The gusset portion 28 of the panty may comprise a gusset panel 32 having a knit construction differing from that of the rest of the fabric body 26, as shown, or alternatively the knit construction can be the same throughout the fabric body. In the illustrated embodiment, the gusset panel 32 is integrally knit with the front panel 22 and is joined to the back panel 24 along a joint or seam 34.

Attached along the edges of the front and back panels that encircle the leg openings 30 is a trim or banding 40, which can be a decorative and/or elastic textile material. In accordance with the first aspect of the invention, the trim 40 contains a sufficient quantity of thermoplastic fibers that the trim is thermally bondable to itself as well as to other textile materials likewise containing a sufficient quantity of thermoplastic fibers. More particularly, in accordance with preferred embodiments of the invention, the trim 40 is ultrasonically bondable to itself and to other ultrasonically bondable materials.

Figure 4:
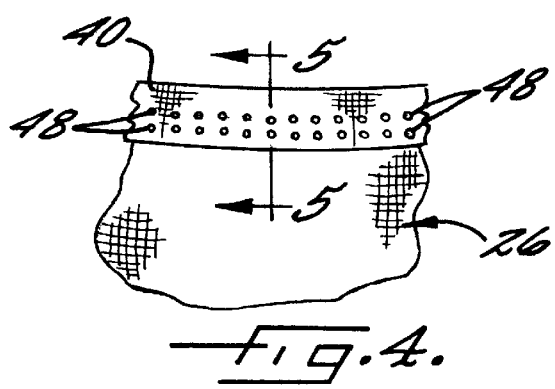
FIG. 4 is a fragmentary, magnified view of a portion of a fabric edge of a garment with a trim applied thereto.
Figure 5:
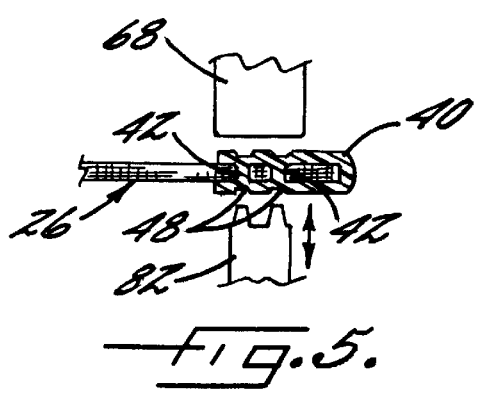
FIG. 5 is a cross-sectional view taken on line 5—5 of FIG. 4.
Figure 6:
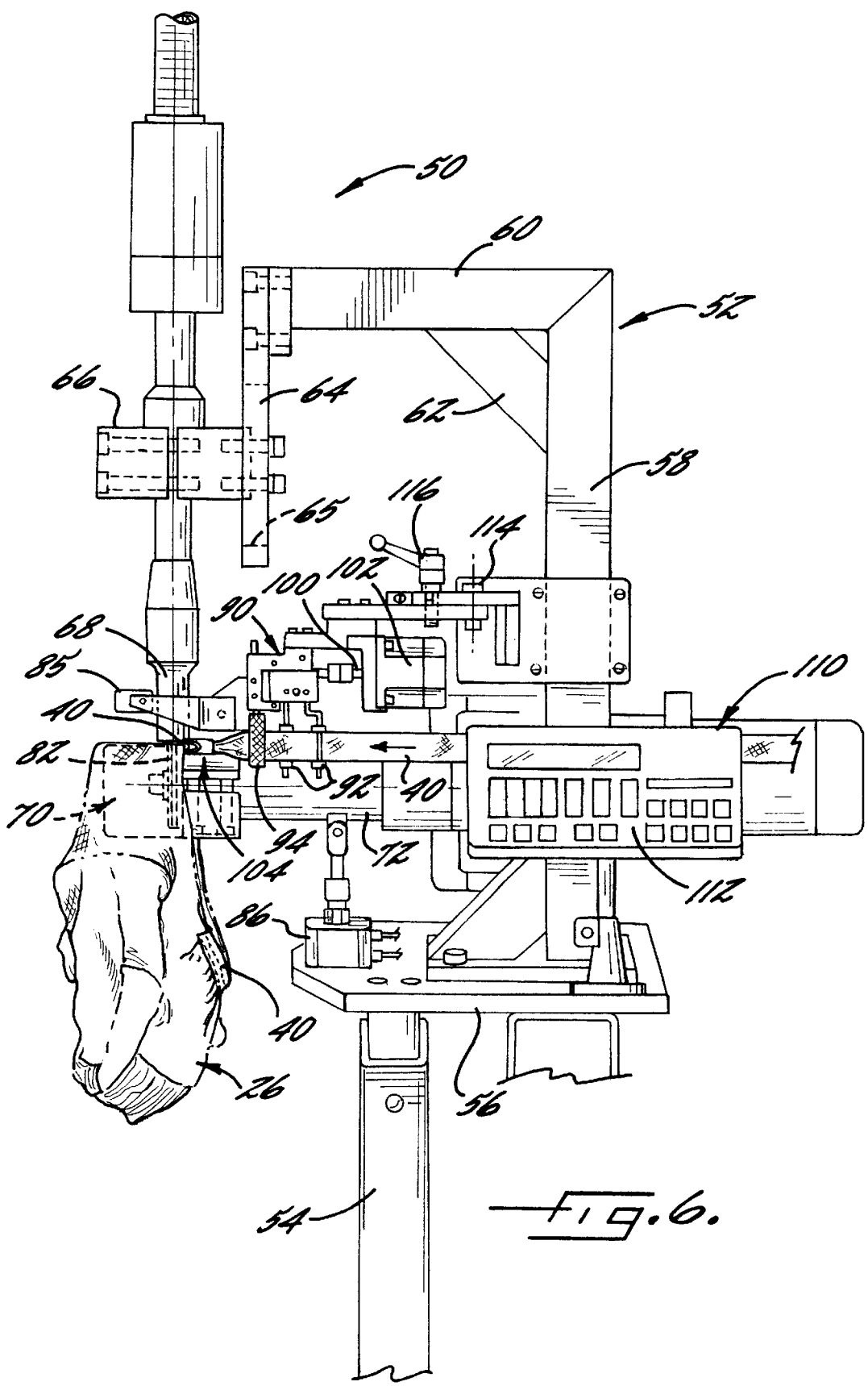
FIG. 6 is a side view from one side of an apparatus for ultrasonically bonding fabric components together in accordance with one embodiment of the invention.
Figure 7:
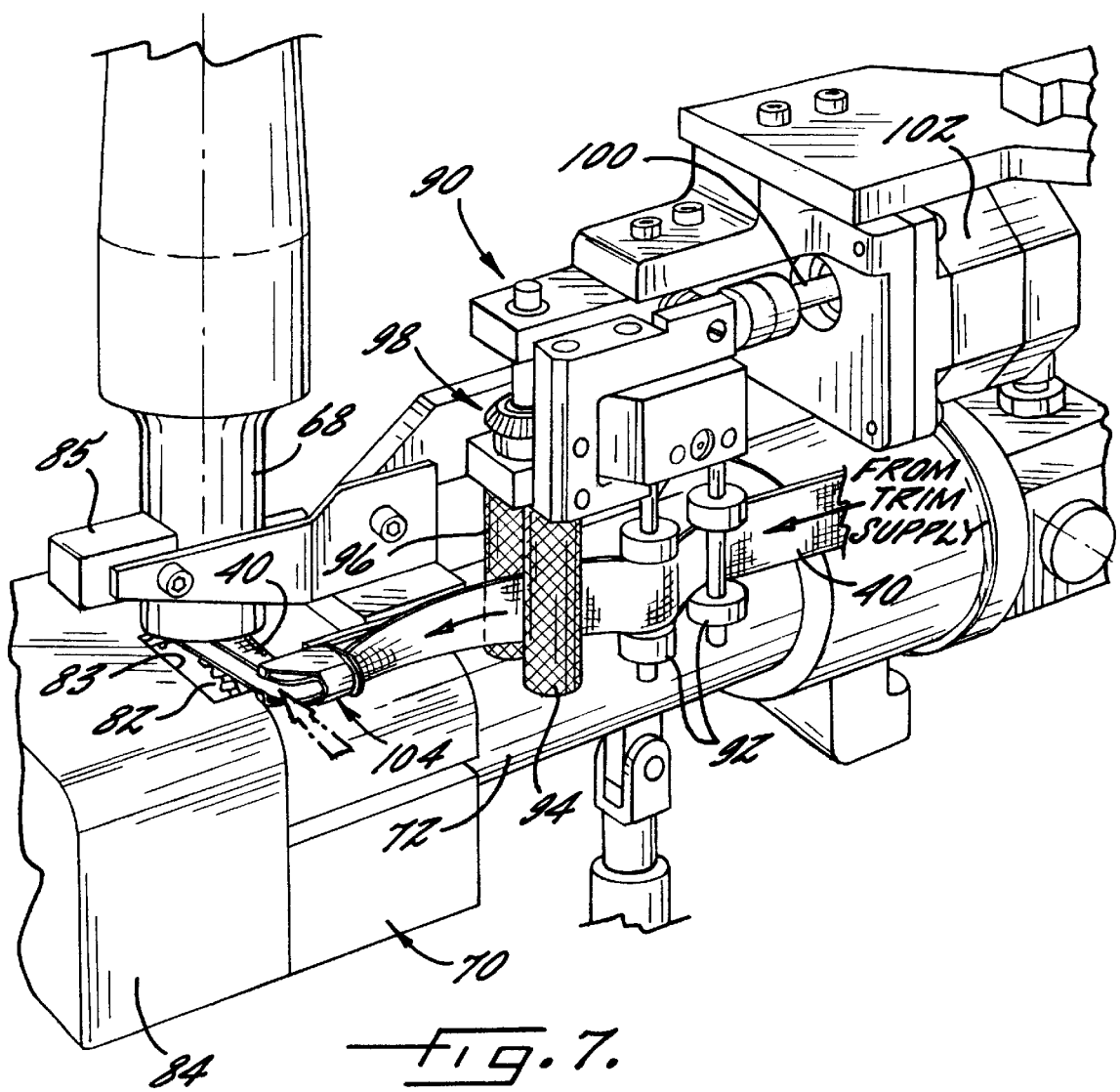
FIG. 7 is a perspective view of the apparatus of FIG. 6.

FIGS. 4 and 5 depict one embodiment of the invention with respect to attachment of the trim 40 to the edge of the fabric body 26 of a garment. The trim 40 advantageously comprises a strip of textile material that is wrapped over the edge of the fabric to which the trim is to be attached so that the edge of the fabric is sandwiched between opposing portions of the trim, as shown in FIG. 5. The trim 40 is then attached to the fabric edge by compressing the opposing portions of the trim and the fabric edge together between a pair of cooperating tools that heat localized regions 48 of the trim so as to cause the thermoplastic fibers in the localized regions to become plastic and flowable. The flowable thermoplastic material from the opposing portions of the trim permeates through the fabric 26 and flows together so as to create continuous columns or filaments 42 of thermoplastic material that are joined to both of the opposing portions of the trim and penetrate through the fabric 26. The heating is then stopped so that the filaments 42 cool and solidify, thereby affixing the trim 40 to the fabric 26.

Preferably, the localized heating of the trim 40 is effected by ultrasonic techniques. Thus, as shown in FIG. 5, an ultrasonic horn 68 is positioned adjacent one side of the trim 40 and an anvil 82 is positioned adjacent the opposite side of the trim. In general, one or more surfaces of the anvil will contact the trim and press the trim against the horn such that only areas of the trim contacted by the anvil surfaces are heated and bonded, whereas depressed or recessed areas of the anvil surface will not press the trim against the horn and thus the areas of the trim corresponding to such recessed areas will not be heated and bonded. Accordingly, the anvil's surface can be configured in various ways to achieve various patterns of heated and bonded areas of the trim. FIG. 5 illustrates a "plunge" process wherein one of the horn 68 and anvil 82 is plunged toward the other so as to press the stationary fabric components between the horn and anvil. Conventional ultrasonic bonding techniques have generally used some type of plunge process. This process is a discrete stepwise process in which a joint that has a length defined by the lengths of the horn and anvil is made, and then if further lengths of the fabric components must be joined to continue the joint, the fabric components must be shifted to bring the unjoined portions of the components between the horn and anvil. The process is repeated as many times as needed in order to make the desired length of the joint. Thus, the plunge process is not a continuous process, and hence is not very efficient.

FIGS. 6 through 10 depict an apparatus 50 for ultrasonically joining fabric components in accordance with a preferred embodiment of the invention. The apparatus of the invention enables ultrasonic seaming to be done in a continuous-feed process that can be performed substantially faster than conventional sewing. The apparatus 50 includes a frame 52 mounted on a pedestal 54. The frame 52 includes a base plate 56 on which is mounted a vertical column 58. A horizontal support beam 60 is affixed in cantilevered fashion to the vertical column 58, reinforced by a corner brace 62. A hanger bracket 64 is affixed to and depends from the free end of the horizontal support beam 60. A clamp 66 is secured to the hanger bracket 64. Preferably, fasteners for the clamp 66 engage a vertically extending elongate aperture 65 in the hanger bracket 64 such that the vertical position of the clamp 66 can be adjusted and then fixed in the adjusted position. Alternatively, other types of mechanisms could be employed for varying the vertical position of the clamp 66.

An ultrasonic horn 68 is fixed in the clamp 66 in a vertical orientation. The horn 68 is generally cylindrical and the clamp 66 includes two clamping members of semi-cylindrical configuration on their inner surfaces that clamp about the horn. The lower end of the horn 68 defines an end face through which ultrasonic energy is emitted.

Figure 8:
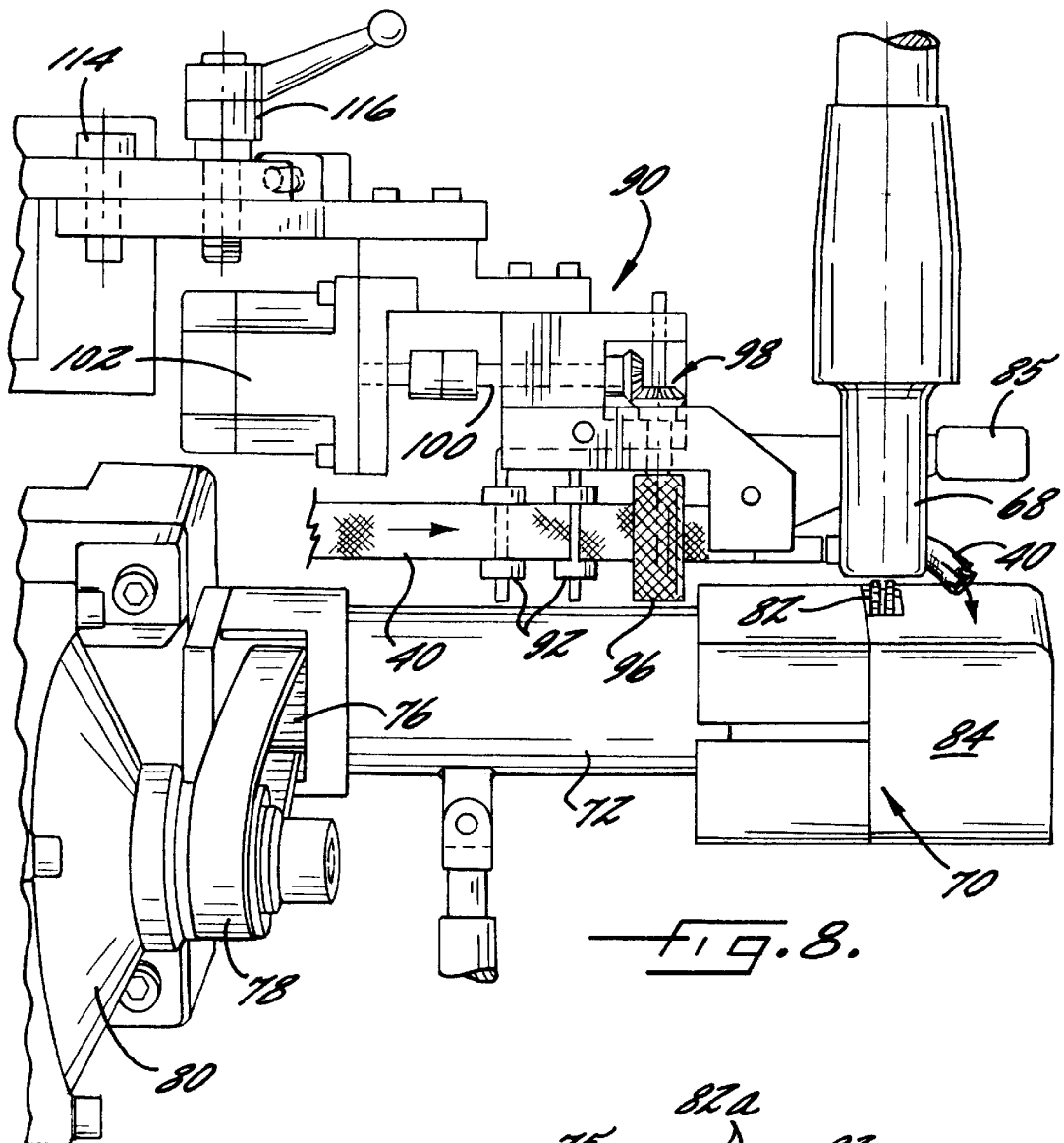
FIG. 8 is a side view from the opposite side of the apparatus from that of FIG. 6.
Figure 9:
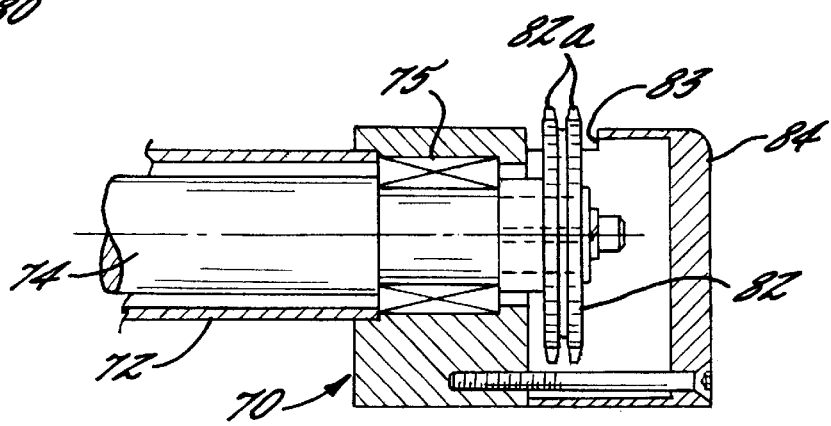
FIG. 9 is a sectioned side view of an anvil wheel housing and shaft enclosure of the apparatus.

The apparatus 50 also includes an anvil wheel housing 70 mounted on one end of a tubular anvil shaft enclosure 72. The anvil shaft enclosure 72 is mounted in cantilevered fashion on the vertical column 58 of the frame. A rotatable anvil shaft 74 is journaled in bearings 75 within the anvil housing 70 (FIG. 9). A drive gear 76 (FIG. 8) is mounted on one end of the anvil shaft 74 in registration with an opening through one side of the anvil shaft enclosure 72. A flexible toothed drive belt 78 passes through this opening and is looped about the drive gear 76. The drive belt 78 is also looped about a geared output shaft of a main drive motor 80 that is mounted on the frame of the apparatus. Thus, operation of the main drive motor 80 causes the anvil shaft 74 to be rotatably driven.

The opposite end of the anvil shaft 74 extends into the anvil housing 70 and has a generally circular anvil wheel 82 mounted thereon. A portion of the circumference of the anvil wheel 82 protrudes out a slot 83 formed in the wall of the anvil housing 70 that faces the horn 68, such that the exposed portion of the anvil wheel is aligned with the end face of the horn. On the outer peripheral surface of the anvil wheel one or more anvil structures 82a (FIG. 9) are formed. The end face of the horn is spaced a predetermined distance from the anvil structures 82a so as to define a nip therebetween. The distance between the horn and anvil surface is selected and the vertical position of the horn is accordingly adjusted with regard to the total thickness of fabric components to be passed through the nip such that the components are slightly compressed between the horn and anvil surface.

Preferably, the assembly of the anvil shaft 74, shaft enclosure 72, and anvil wheel housing 70 can be pivoted about a pivot on the main frame of the apparatus so as to move the anvil and its housing downward away from the horn 68 by a slight amount to facilitate placing a garment into position on the anvil, and then the assembly can be pivoted back up into its normal working position. A pneumatic cylinder 86 or the like preferably is mounted on the base plate 56 and coupled to the shaft enclosure 72 for pivoting the shaft enclosure and anvil housing up and down.

Thus, the fabric components to be joined are passed through the nip supported on the outer peripheral surface of the anvil wheel 82, and the anvil wheel is rotated or is allowed to rotate such the fabric components do not slip on the anvil surfaces, i.e., the anvil surfaces are substantially stationary relative to the fabric components. Ultrasonic energy emitted by the horn 68 is focused by the anvil structures 82a on those areas of the fabric components corresponding to the contact areas between the anvil structures and the fabric component that lies against the anvil structures. These areas are heated and made plastic within the nip, and the plasticized material cools as the components exit the nip so as to effect a bond between the components as previously described.

Preferably, as noted above, the anvil wheel 82 is rotatably driven by the motor 80. The anvil wheel 82 thus forms a part of a drive system that causes the fabric components to be moved through the nip between the horn and anvil. More particularly, the outer peripheral surface of the anvil wheel 82 frictionally grips the fabric such that rotation of the anvil causes the fabric to move along with the portion of the outer peripheral anvil surface that protrudes through the slot 83 in the anvil housing 70. The apparatus can include a foot pedal (not shown) or the like to allow an operator to start and stop the main drive motor, similar to the operation of a conventional sewing machine. The horn 68 is energized only when the fabric components to be bonded are present in the nip and the main drive motor is operating. The apparatus can include an optical sensor 85 for detecting whether there is a fabric panel present on the upper surface of the anvil housing 70; if there is not, then the operation of the horn is disabled, and the operation of the drive system can also be disabled, if desired.

As an alternative to using the anvil wheel to move the fabric through the nip, it is possible to provide other means for feeding the fabric components through the nip and the anvil wheel can be freewheeling such that it is allowed to rotate as the fabric components pass through the nip in order to keep the anvil substantially stationary relative to the fabric.

Where the anvil wheel 82 is positively driven by the motor 80, the dwell time of the fabric components in the nip can be regulated by regulating the rotational speed of the anvil. The dwell time and the frequency of the ultrasonic energy emitted by the horn are two control variables that affect the characteristics of the bond between the fabric components. The present invention enables the dwell time to be regulated in a continuous-feed type of ultrasonic bonding process in a convenient manner simply by controlling the speed of the anvil.

The present invention also enables bonds to be made between two components even when one of the components may not contain a sufficient quantity of thermoplastic fibers to render the component ultrasonically bondable, as long as the other component is ultrasonically bondable. The basic process in this regard was described above in connection with FIGS. 4 and 5 illustrating the attachment of an ultrasonically bondable trim to the edge of a fabric panel that may be ultrasonically bondable but need not be. FIGS. 6 through 10 show how the apparatus 50 is adapted to facilitate the attachment of the trim in this manner.

Figure 10:
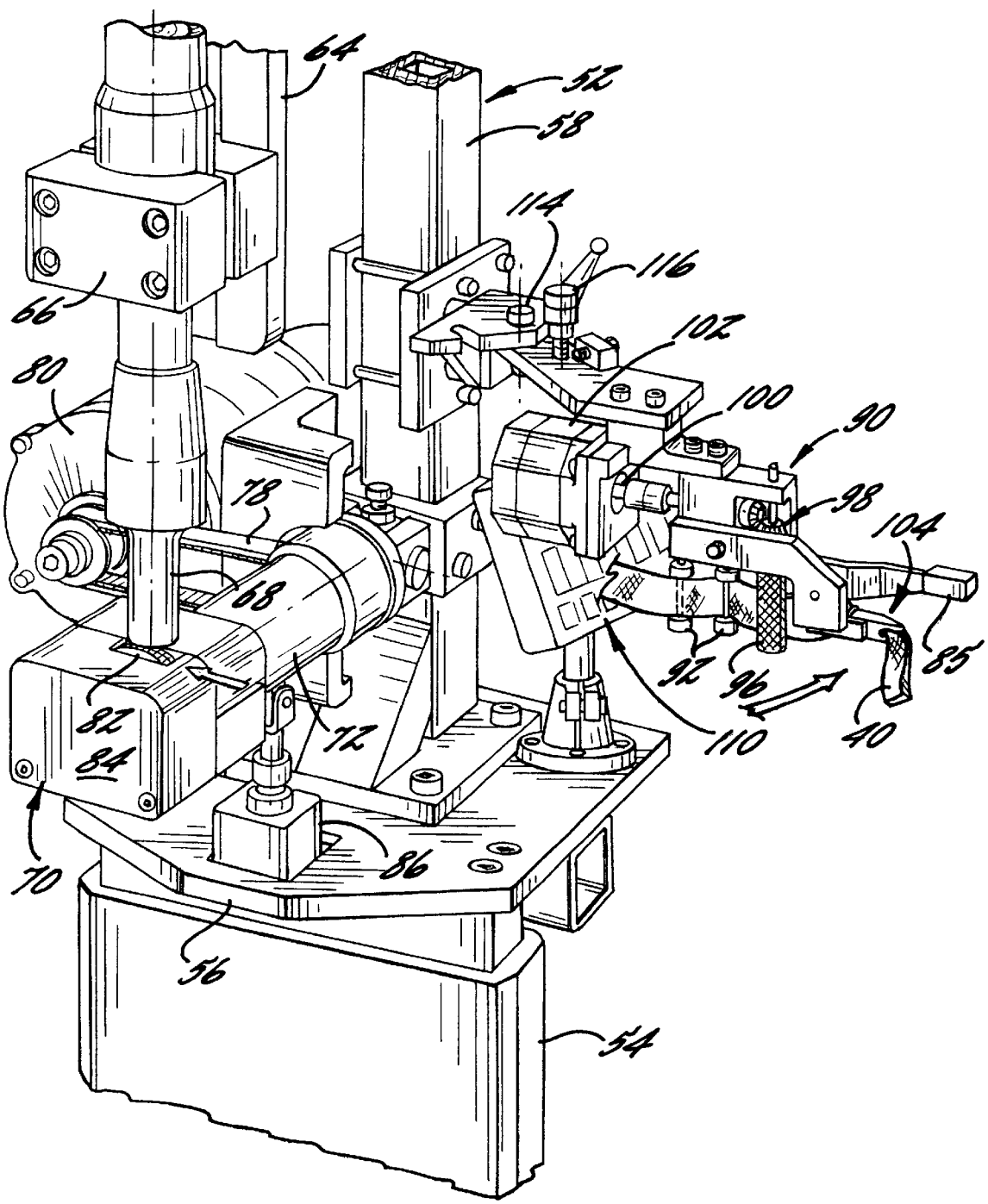
FIG. 10 is a perspective view of the apparatus with the trim feed mechanism pivoted out of the normal operative position.

Thus, the apparatus 50 includes a feed assembly 90 for feeding a continuous strip of ultrasonically bondable trim 40 into the nip between the horn 68 and the anvil wheel 82 with the trim folded about the edge of a fabric panel 26 to which the trim is to be attached. The feed assembly 90 includes guides 92 for guiding the trim 40 from a trim supply (not shown) into a nip between a pressure roll 94 and a driven feed roll 96. The feed roll 96 is coupled through a right-angle gear arrangement 98 to a drive shaft 100 that in turn is connected to an output shaft of a feed drive motor 102, such that operation of the feed drive motor 102 causes the feed roll 96 to be rotatably driven, thus advancing the trim 40 from the trim supply. The feed assembly 90 also includes a trim folder 104 after the feed roll 96 for folding the trim in half lengthwise so that the edge of the fabric panel can be received between the two halves of the trim. The edge of the fabric panel and the trim folded thereover are fed into the nip between the horn 68 and the anvil wheel 82. Preferably, the anvil wheel 82 is rotatably driven so as to advance the fabric panel and trim through the nip, and the horn and anvil locally heat and bond the trim to the fabric panel edge. The speed at which the trim is advanced by the feed roll 96 preferably matches the speed of the outer peripheral surface of the anvil so that the trim is advanced at the same rate as the speed at which the fabric components move through the nip; however, a deliberate speed difference between the trim advance rate and the fabric advance rate could be used, if desired, by appropriately controlling the trim feed assembly and the anvil drive system. In this regard, the apparatus 50 also includes a controller 110 coupled with the main drive motor 80 and the feed motor 102 for coordinating the operation of these motors so that the trim is advanced at the appropriate rate depending on the speed of the anvil. The trim feed assembly advantageously also includes a metering device such as an encoder (not shown) operable to measure the length of trim that has been fed so that a desired length of trim can be fed corresponding to the length of the fabric edge to which the trim is to be applied; furthermore, the apparatus can employ an automatic trim cutting device (not shown) that can be activated to cut the trim when the desired length of trim has been fed. The controller 110 also includes an operator interface 112 allowing an operator to select various functions for the apparatus. As shown in FIGS. 8 and 10, the trim feed assembly 90 is mounted to the frame member 58 in a cantilever fashion about a pivot 114 for pivotal movement of the feed assembly away from the horn 68 to allow better access to the area of the anvil and horn, such as when changing the anvil as described below.

The anvil housing 70 preferably includes a cover portion 84 that can be removed to gain access to the anvil wheel 82, and in particular so that the anvil wheel can be removed from the anvil shaft 74 and replaced with another anvil wheel. Replacement of the anvil wheel may be necessary in the event that the anvil wheel becomes damaged or worn, or it may be desired to replace the anvil wheel with a differently configured one. More specifically, as previously described, the anvil structures that contact and focus the ultrasonic energy can be configured in different ways to impart different patterns of bonded regions to the fabric. For instance, where the outer peripheral surface of the anvil wheel is continuous and circular, a continuous bond line will be formed joining the fabric components together. The anvil wheel may have two or more such continuous circular surfaces located side-by-side so as to form two or more side-by-side continuous bond lines.

Alternatively, the anvil structures may be discontinuous in the circumferential direction, so that a series of bonded regions 48 are formed spaced apart along the length of the seam as shown in FIG. 4. The areas of the anvil that contact the fabric and focus the ultrasonic energy can be designed to impart an appearance to the fabric as if the fabric had been stitched in a conventional fashion, for example simulating the needle holes that would be formed by a needle. Various styles of stitching can be simulated. Other designs and patterns can be imparted to the fabric by appropriately configuring the anvil surface. There is literally no limit to the variety of patterns that can be achieved.

The apparatus 50 is not limited to attaching trim to the edges of fabric panels. The apparatus can also be used for making lap joints and butt joints between two fabric panels. To make a lap joint, the two fabric panels to be joined are simply overlapped in the desired configuration and are passed through the nip between the horn and the anvil, similar to the way a conventionally sewn seam would be made. A butt joint can be made by laying one fabric panel atop the other panel and passing the panels through the nip to form a seam line adjacent an edge of the panels, and then unfolding the panels so that they are co-planar.

Many modifications and other embodiments of the invention will come to mind to one skilled in the art to which this invention pertains having the benefit of the teachings presented in the foregoing descriptions and the associated drawings. For example, while the movable anvil support is described herein is a circular disk-like member 82, other types of anvil supports can be used, the only requirement being that a surface of the anvil support on which the anvil structures are mounted be movable along with the fabric components passing through the nip of the machine. Thus, for instance, the anvil support could be an endless flexible chain-like or belt-like structure looped about a drive roll or sprocket and possibly about one or more additional guide rolls or sprockets. Other types of anvil support structures could also be used. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for attaching a strip of ultrasonically bondable trim along an edge of a fabric component by folding the trim over the edge of the component and bonding the trim thereto, the apparatus comprising:

an ultrasonic horn operable to emit ultrasonic energy through a fabric-engaging end face thereof;

a movable anvil support having an outer peripheral surface on which one or more anvil structures are formed, the anvil support and the horn being arranged so as to define a nip between the fabric-engaging surface of the horn and the one or more anvil structures for receiving the trim and fabric component to be joined, the anvil support rotating about an axis thereof as the trim and fabric component pass through the nip such that the one or more anvil structures are stationary relative to the trim and fabric component in the nip, the horn emitting ultrasonic energy and the one or more anvil structures focusing the ultrasonic energy on one or more regions of the ultrasonically bondable trim contacted by the one or more anvil structures so as to locally heat and bond the one or more regions; and a feed assembly for folding the trim and feeding the folded trim into the nip between the horn and the one or more anvil structures.

2. The apparatus of claim 1, further comprising a drive system for engaging the components and moving the components through the nip.

3. The apparatus of claim 2, wherein the anvil support is rotatably driven and comprises part of the drive system, rotation of the anvil support causing the components to be moved through the nip.

4. The apparatus of claim 3, wherein the drive system further comprises a main drive motor coupled with the anvil support for rotatably driving the anvil support.

5. The apparatus of claim 1, wherein the anvil support comprises a generally circular disk-shaped member.

6. The apparatus of claim 1, wherein the feed assembly includes a folding device and a plurality of guides for guiding the trim from a trim supply to the folding device.

7. The apparatus of claim 6, wherein the feed assembly further comprises a feed motor for rotatably driving a feed roll that engages the trim so as to advance the trim from the trim supply toward the nip.

8. The apparatus of claim 7, further comprising a main drive motor coupled with the anvil support for rotatably driving the anvil support such that the anvil support moves the components through the nip, and a controller for coordinating operation of the main drive motor and the feed motor such that the trim is advanced by the feed motor and feed roll at a rate substantially matching a speed of the outer peripheral surface of the anvil support.

9. The apparatus of claim 1, wherein the anvil support has mounted thereon a plurality of spaced anvil structures.

10. The apparatus of claim 9, wherein the anvil structures comprise a plurality of spaced protrusions for contacting the ultrasonically bondable component such that the component is heated and bonded only at regions thereof contacted by the protrusions.

11. The apparatus of claim 10, wherein the protrusions are spaced along the anvil in a direction in which the outer peripheral surface of the anvil support moves.

12. The apparatus of claim 1, wherein the anvil structures are configured to heat and bond the at least one ultrasonically bondable component so as to impart an appearance of stitching thereto.

13. The apparatus of claim 1, wherein the anvil structure that contacts the at least one ultrasonically bondable component is continuous about the circumference of the anvil.

14. A method for joining together two or more fabric components without thread, the components including at least an ultrasonically bondable trim and an edge of a fabric component about which the trim is wrapped and attached thereto, the method comprising:

providing one or more anvil structures mounted on an anvil support, the anvil support being rotatable about an axis;

positioning an ultrasonic horn proximate the anvil support so as to define a space between the horn and the one or more anvil structures;

passing the edge of the fabric component through the space while supported on the anvil support, the anvil support rotating about the axis during passage of the edge of the fabric component through the space;

using a trim feed assembly to advance the ultrasonically bondable trim from a supply thereof toward the space and to fold the trim about the edge of the fabric component such that the folded trim and edge pass through the space with portions of the trim and the edge in overlying relation; and pressing the overlying portions in the space between the horn and the one or more anvil structures and operating the horn to emit ultrasonic energy such that the energy is focused by the one or more anvil structures onto the overlying portions and the overlying portions are heated and bonded at regions thereof contacted by the one or more anvil structures so as to bond the folded trim to the edge of the fabric component.

15. The method of claim 14, wherein the anvil support is rotatably driven about the axis by a drive device, the overlying portions of the components being carried through the space by the rotating anvil support.

16. The method of claim 15, further comprising regulating dwell time of the components in the space by regulating rotational speed of the anvil support.

* * * * *

UNITED STATES PATENT AND TRADEMARK OFFICE
CERTIFICATE OF CORRECTION

PATENT NO.    : 6,517,651 B2
DATED         : February 11, 2003
INVENTOR(S)   : Azulay It is certified that error appears in the above-identified patent and that said Letters Patent is hereby corrected as shown below:

<u>Title page,</u>
Item [56], References Cited, U.S. PATENT DOCUMENTS, insert the following:

| | | |
|---|---|---|
| -- 3,785,910 | 1/1974 | Parry |
| 4,535,040 | 8/1985 | Kline --. |

Signed and Sealed this

Twenty-ninth Day of July, 2003

JAMES E. ROGAN
*Director of the United States Patent and Trademark Office*